Figure 1:
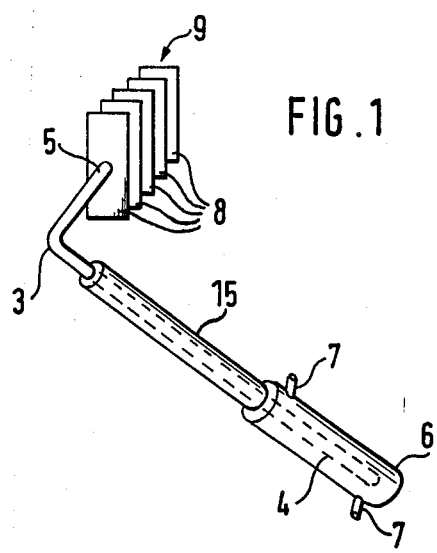

United States Patent [19]

Konitzer

[11] Patent Number: 4,773,473
[45] Date of Patent: Sep. 27, 1988

[54] HEAT-EXCHANGER FOR FUEL IN AN INTERNAL COMBUSTION ENGINE

[75] Inventor: Hansjörg Konitzer, Lohhof, Fed. Rep. of Germany

[73] Assignee: Bayerische Motoren Werke Aktiengesellschaft, Munich, Fed. Rep. of Germany

[21] Appl. No.: 893,778

[22] Filed: Aug. 6, 1986

[30] Foreign Application Priority Data

Aug. 6, 1985 [DE] Fed. Rep. of Germany ....... 3528111

[51] Int. Cl.⁴ .......................... F01P 3/12; F28D 15/02
[52] U.S. Cl. ......................................... 165/41; 165/51; 165/104.21; 123/541; 123/553; 123/557
[58] Field of Search .................... 165/51, 41, 104.21; 123/541, 557, 540, 542

[56] References Cited

U.S. PATENT DOCUMENTS

| | | | |
|---|---|---|---|
| 3,332,476 | 7/1967 | McDougal | 123/540 |
| 3,884,293 | 5/1975 | Pessolano et al. | 165/51 |
| 4,072,138 | 2/1978 | Hawkins et al. | |
| 4,098,236 | 7/1978 | Obawa | 123/541 |

FOREIGN PATENT DOCUMENTS

| | | | |
|---|---|---|---|
| 2418548 | 11/1974 | Fed. Rep. of Germany | 123/541 |
| 3231881 | 1/1984 | Fed. Rep. of Germany | |

Primary Examiner—Albert W. Davis, Jr.
Attorney, Agent, or Firm—Barnes & Thornburg

[57] ABSTRACT

An heat exchange arrangement for a fuel system of an internal-combustion engine vehicle utilizing a heat pipe with an evaporizing zone for cooling the fuel directed from the engine to the fuel tank and a condensation zone located in an air path of the vehicle.

6 Claims, 2 Drawing Sheets

HEAT-EXCHANGER FOR FUEL IN AN INTERNAL COMBUSTION ENGINE

The present invention relates to a heat-exchange arrangement for the fuel of an internal combustion engine.

In view of the increasing use in traffic of fuels with new highly volatile additives burdening the environment in lieu of the additives hitherto serving, for example, as anti-knock additives, the fuel cooling system gains increasingly in importance. For an effective cooling of the fuel, an air-conditioning installation installed in the motor vehicle and serving, in particular, for the temperature control in the vehicle passenger space is predominantly presupposed in the known proposals (e.g. DE-A No. 32 31 881). However, an air-conditioning installation serving exclusively the fuel cooling is disclosed in the DE-A No. 32 14 874 which operates according to the absorption principle.

Air conditioning installations with compression- or absorption-cooling machines are apparatus-intensive and therewith costly. Furthermore, the space requirement is considerable.

The invention is concerned with the task to indicate an effective heat-exchange arrangement for the fuel of an internal combustion engine which is independent of costly installations.

This task is solved in a surprisingly simple manner by the use of a heat pipe (heat-conducting pipe, heat pipe).

A heat pipe represents by its simple construction a heat-exchange arrangement adapted to be easily accommodated in a motor vehicle, which serves in one case for the cooling and in another case, if desirable to heat a cold fuel; it can be used for the heating of fuels which become viscous at low temperatures.

An advantageously simple construction of the heat pipe as cooling arrangement for the fuel is obtained by a heat pipe having a fuel cooling evaporation end and a heat dissipating condensation end, wherein fuel is led from a fuel tank to an area surrounding the evaporation end where the fuel is cooled and then fed to the engine in a cooled state.

With the use of the heat pipe as cooling arrangement in a motor vehicle, this simple construction enables to utilize meaningfully air guidances present already within the motor vehicle for different purposes. Thus, the air-heat-exchanger condensation area of the heat pipe can be arranged in the air guidance to the radiator of a liquid-cooled internal combustion engine whereby a fan, especially an additional multi-stage fan and eventually controlled in dependence on temperature reinforces the cooling effect. If, in contrast, the heat pipe is to be located not only with its fuel cooler evaporation area, but also with its air heat-exchanger condensation area in a zone less endangered in case of a crash, then the fresh air channel of the ventilating installation of the motor vehicle offers itself for that purpose for the arrangement of the air-heat-exchanger of the heat pipe. If the fuel cooler of the heat pipe is provided in the rear of the motor vehicle within the fuel tank, at the inlet of a supply pump or in the return line, the air heat-exchanger of the heat pipe can be arranged in an exhaust channel of the vehicle passenger space for achieving a short heat pipe. If, finally, a motor vehicle is equipped with a known air-conditioning installation, the effect of the heat pipe can be increased by the arrangement of its air heat-exchanger in an air-conditioning air guidance.

As can be seen from the preceding, the fuel cooler of the heat pipe can be arranged at any desired location of the supply arrangement. This results, inter alia, in the advantage that fuel lines need not be extended into crash-endangered areas of the motor vehicle. The necessary distance between fuel cooler and air heat-exchanger is bridged by the heat pipe which is heat-insulated especially with a passage through heat-intensive areas of the motor vehicle. If the fuel is cooler than the air conducted over the air-heat-exchanger, the heat pipe does not operate, thus a self-regulating system is present. The selection of the air-heat-exchanger in the end area of the heat pipe which discharges heat, is to be regarded also in this sense. The heat discharge into a liquid or vaporized medium would more particularly signify an arrangement more costly in construction and arrangement. A heat pipe with an air heat-exchanger can also be manufactured more simply as refitting part and installed more easily in the motor vehicle.

The drawing shows in

Figure 2:
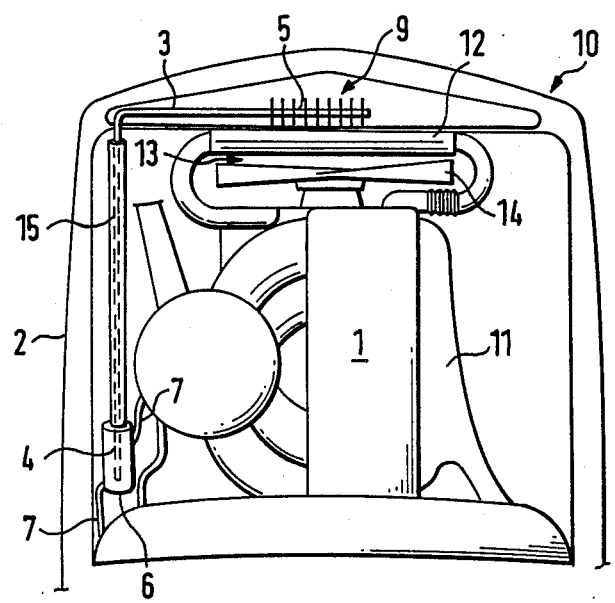
Figure 3:
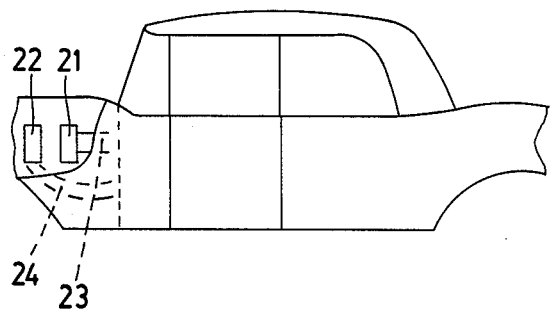

FIG. 1 one embodiment of a heat pipe for the fuel cooling in a motor vehicle,

FIG. 2 schematically the arrangement of the heat pipe according to FIG. 1 in the front section of a motor vehicle, and FIG. 3 shows alternative locations for the heat pipe.

A fuel installation not illustrated in detail for an internal combustion engine 1 in a motor vehicle 2 is equipped with a heat pipe 3 for the cooling of the fuel.

The heat pipe 3 is in a known manner an enclosed system with a liquid under low pressure which evaporates in one end area 4 of the heat pipe 3 by heat absorption and condenses in the other end area 5 by heat discharge. The condensed liquid is conducted from the condensation zone 5 by way of a capillary structure arranged at the inner circumference of the heat pipe back to the evaporation zone 4.

Corresponding to the operation described hereinabove, the heat pipe 3 is surrounded in the evaporation zone 4 by a chamber 6 which is arranged in a return line 7 of the fuel installation. For improving the heat transfer additional heat-exchanger surfaces may be provided along the outer circumference of the heat pipe 3 within the area of the evaporation zone.

In the end area corresponding to the condensation zone 5, the heat pipe 3 is equipped with lamellae 8 of large surface for the rapid heat discharge which altogether form an air-heat-exchanger 9.

With an internal combustion engine 1 arranged in the front section 10 of a motor vehicle 2, the heat pipe 3 is arranged on the side opposite the exhaust gas installation 11 of the internal combustion engine 1, whereby the chamber 6 provided for the fuel cooling is arranged in a relatively crash-safe area of the front section 10. By a correspondingly long construction of the heat pipe 3, fuel lines placed into crash-endangered zones can be avoided thereby.

The heat pipe 3 extends approximately over the length of the front section 10 and after an angular bend is extended with the air-heat-exchanger 9 in front of the end face of the radiator 12 for the liquid-cooled internal combustion engine 1. A fan 14 of the internal combustion engine 1 is arranged to the rear of the radiator 12 in an air guidance 13.

The cooling effect of the heat pipe 3 can be increased by an additional fan (not shown), especially by an additional fan which is multi-stage and/or adapted to be engaged in dependence on temperature. An insulation 15 for the portion of the heat pipe 3 extending adjacent in the front section 10 of the internal combustion engine 1 also serves the same purpose.

The air-heat-exchanger can also be arranged in an air channel for the supply of fresh air from inlet 21 to duct 24 leading to the passenger compartment and/or recirculated air for the heating-/air-conditioning apparatus or finally in an air channel for the exhaust of air through duct 23 to outlet 21 out of the passenger interior space.

However, the heat pipe can also serve as heating device in a fuel installation. This type of use is advantageous with a fuel that becomes viscous at lower temperatures. In order to assure during the drive at low temperatures the supply of an internal combustion engine in a motor vehicle with such a fuel, the heat pipe can be arranged with its condensation zone in the fuel tank near the feed pump. Heat is given off to the fuel by way of the condensation zone of the heat pipe, this heat is conducted to such location from the evaporation zone of the heat pipe whereby the evaporation of the heat pipe is in connection with a heat source of the internal combustion engine or of the vehicle. A liquid-cooling medium of the internal combustion engine and/or the exhaust gases, respectively, the exhaust gas line of the internal combustion engine may serve as heat source. The described use of the heat pipe is advantageous in particular with diesel fuels.

I claim:

1. A heat exchange arrangement for a fuel system of an internal-combustion engine, arranged in a motor vehicle fuel system between a reservoir for the fuel and the internal-combustion engine and having a forward-flow fuel line and a return-flow fuel line and a heat pipe means for cooling of the fuel; wherein the heat pipe means has a first evaporator zone end area serving to cool the fuel and arranged as a chamber means through which the fuel return-flow line flows and on other end area acting as a condensation zone wherein an air heat exchanger is arranged.

2. A heat exchange arrangement according to claim 1, wherein the air heat exchanger is arranged in an air guiding means of the automobile in at least one of a cooling air guiding means, a fresh-air source, an air-conditioning-air source, and an exhaust-air guiding means.

3. Heat pipe means in a fuel system of an internal-combustion engine of a motor vehicle comprising:
a heat pipe means having an evaporator zone in an end area thereof and being surrounded by fuel in a return-flow line of the fuel system leading from the internal-combustion engine to a fuel reservoir; said evaporator zone end area of said heat pipe means cooling the fuel in said return-flow line; said evaporator zone being located in a crash-secure area of the vehicle, arranged toward a rearwardly located end area of the internal-combustion engine in the motor vehicle; and another end area of the heat pipe means forming a condensation zone arranged in an air guiding means of the motor vehicle.

4. A motor vehicle according to claim 3, wherein the evaporator zone of the heat pipe means is arranged in a chamber that is connected with the fuel return flow line, that is provided adjacent a side of the motor vehicle opposite an engine exhaust of the internal-combustion engine.

5. A motor vehicle according to claim 3, wherein the condensation zone of the heat pipe means is arranged upstream of a radiator in the cooling air guiding means of the internal-combustion engine; and wherein heat insulation means is provided for the heat pipe means, located between said two end areas of said heat pipe means and close to heat-emitting devices of the internal-combustion engine.

6. A motor vehicle according to claim 4, wherein the condensation zone of the heat pipe means is arranged upstream of a radiator in the cooling air guiding means of the internal-combustion engine; and wherein heat insulation means is provided for the heat pipe means, located between said two end areas of said heat pipe means and close to heat-emitting devices of the internal-combustion engine

* * * * *